Aug. 7, 1962  F. HANUSCH ETAL  3,047,907
APPARATUS FOR PROCESSING THERMOPLASTIC SYNTHETIC
MATERIALS IN SCREW EXTRUDERS AND KO-KNEADERS
Filed Aug. 29, 1960
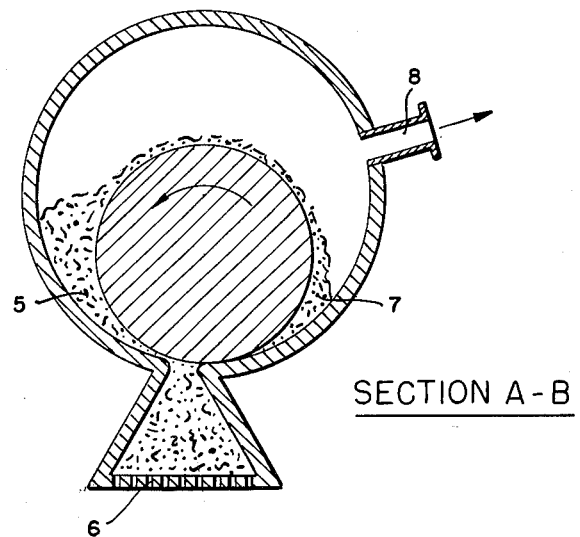
SECTION A-B
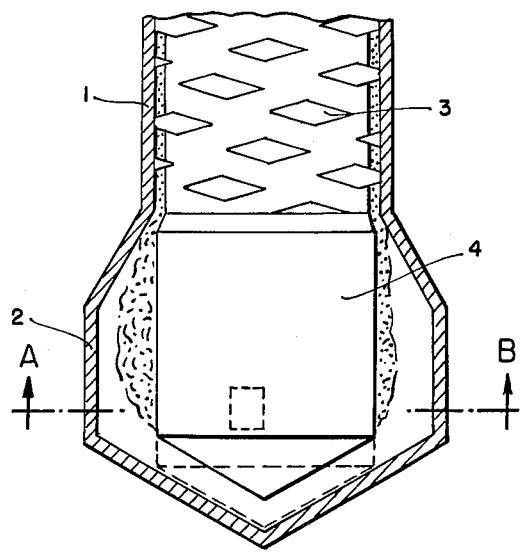
*INVENTORS:*
FRITZ HANUSCH
AUGUST RETTIG
BY *Marshall, Johnston,*
*Cook & Root*  ATT'YS 3,047,907
APPARATUS FOR PROCESSING THERMOPLASTIC SYNTHETIC MATERIALS IN SCREW EXTRUDERS AND KO-KNEADERS
Fritz Hanusch and August Rettig, Ludwigshafen, Rhine-Gartenstadt, Germany, assignors to Badische Anilin- & Soda-Fabrik Aktiengesellschaft, Ludwigshafen am Rhine, Germany
Filed Aug. 29, 1960, Ser. No. 52,660
4 Claims. (Cl. 18—12)

This invention relates to an apparatus to be mounted on screw extruders and ko-kneaders and also to the use of this apparatus for improved and more careful processing of thermoplastics or of plastics containing additives.

Thermoplastic synthetic materials are processed in screw extruders and ko-kneaders to strands, bands, tubes and similar elongated moldings, and the object of the processing may be either the actual molding or the preparation of a homogeneous mixture of plastics and additives or of different plastics. When merely a mixing effect is aimed at, the strands or bands, after having been extruded and cooled, are usually comminuted and used in this form in the final processing.

The new apparatus comprises a chamber arranged eccentrically at the outlet end of the injection cylinder of a screw extruder or ko-kneader, said chamber being provided with a discharge nozzle and having an internal diameter larger than the diameter of the cylinder, and also comprises at the front end of the screw a journal which projects freely into the eccentric chamber. The center of the annexed chamber with respect to the center of the said journal is so arranged that, in relation to the direction of rotation of the journal, a slotlike constriction is formed between the journal and the wall of the chamber immediately behind the discharge nozzle. The axis of the discharge nozzle is arranged substantially perpendicular to the direction of conveyance at the constriction between the journal and the chamber wall, and opposite to the constriction a further opening in the chamber may be provided.

The apparatus may be used with advantage in conjunction with ko-kneaders. By ko-kneaders we understand continuously acting mixing and kneading machines in which the screw carries out simultaneously a rotary and reciprocatory movement. Such ko-kneaders are very widely used for mixing plastics. It has been found to be very disadvantageous, however, that the strands or bands extruded by ko-kneaders vary in cross-section in rhythm with the reciprocation of the screw. Consequently a non-uniform granulate is obtained when the strand is comminuted. This defect is obviated by passing the strand or band again through profiling rollers or a discharge screw or by passing threadlike moldings over a number of decelerated deflecting pulleys. These methods are however uneconomical and may prove harmful to the quality of the plastic.

With the apparatus according to this invention there are obtained in a simple way on extruders as well as on ko-kneaders, threads, strands, bands, tubes and the like of thermoplastic synthetic materials with uniform cross-section.

The characteristic features of the apparatus will now be described with reference to the accompanying drawings which are diagrammatic and given by way of example only.

The cylinder 1 of a ko-kneader is provided with a chamber 2, of larger diameter, which is eccentric to the cylinder 1. The screw 3 is extended by a journal 4. In this way there is formed an anti-friction bearing with an extremely large clearance. The direction of rotation of the screw is indicated by an arrow. By reason of the eccentric position of the chamber with respect to the cylinder and screw, a zone of increased pressure is set up in the region of the wedge gap 5. The discharge nozzle is arranged in the pressure zone perpendicularly to the direction of conveyance. In this way, the reciprocatory motion of the screw remains without influence on the flow of the thermoplastic material in the nozzle, so that the strands leaving the nozzle have a constant diameter.

The apparatus may also be incorporated with advantage in screw extruders or ko-kneaders for the purpose of removing from thermoplastic materials readily volatile constitutents, as for example water or low molecular weight components. Since the surface of the plastic in the chamber is continuously renewed as a result of the rolling movement and since at the same time there is formed behind the narrowest gap cross-section a pressureless zone 7, water, monomers and other volatile constituents can easily vaporize. For this purpose, another opening 8 is provided in the chamber wall in the half of the chamber opposite to the narrowest gap cross-section and this is preferably connected to a suction apparatus to diminish the gas pressure in this half of the chamber.

What we claim is:

1. Apparatus for processing thermoplastic synthetic materials in screw extruders and ko-kneaders characterized by a chamber provided at the outlet end of the injection cylinder of a screw extruder, said chamber being eccentric to the cylinder and having an internal diameter larger than that of the cylinder, an extension of the screw of the screw extruder which projects freely into said eccentric chamber, and an outlet nozzle from said chamber, the eccentricity of said chamber and the position of said outlet nozzle being such that a constriction between said extension and the chamber wall is formed immediately behind said outlet nozzle with respect to the direction of rotation of said extension.

2. Apparatus for processing thermoplastic synthetic materials in screw extruders and ko-kneaders characterized by a chamber provided at the outlet end of the injection cylinder of a ko-kneader, said chamber being eccentric to the cylinder and having an internal diameter larger than that of the cylinder, an extension of the screw of the ko-kneader which projects freely into said eccentric chamber, and an outlet nozzle from said chamber, the eccentricity of said chamber and the position of said outlet nozzle being such that a constriction between said extension, and the chamber wall is formed immediately behind said outlet nozzle with respect to the direction of rotation of said extension.

3. Apparatus as claimed in claim 1 wherein the axis of the outlet nozzle is substantially perpendicular to the direction of conveyance of the plastic at the constriction between the extension and the chamber wall.

4. Apparatus as claimed in claim 1 comprising an opening in the chamber wall in that part of the chamber which is opposite to the narrowest gap between the extension and the chamber wall.

References Cited in the file of this patent
UNITED STATES PATENTS

| | | |
|---|---|---|
| 2,127,857 | Bond | Aug. 23, 1938 |
| 2,319,859 | Hale | May 25, 1943 |
| 2,645,813 | Swallow | July 21, 1953 |